(12) United States Patent
Chen et al.

(10) Patent No.: US 12,222,970 B2
(45) Date of Patent: Feb. 11, 2025

(54) GENERATIVE EVENT EXTRACTION METHOD BASED ON ONTOLOGY GUIDANCE

(71) Applicant: ZHEJIANG UNIVERSITY, Hangzhou (CN)

(72) Inventors: Huajun Chen, Hangzhou (CN); Hongbin Ye, Hangzhou (CN); Ningyu Zhang, Hangzhou (CN); Shumin Deng, Hangzhou (CN); Zhen Bi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/280,655

(22) PCT Filed: Sep. 23, 2022

(86) PCT No.: PCT/CN2022/120840
§ 371 (c)(1),
(2) Date: Sep. 6, 2023

(87) PCT Pub. No.: WO2023/051399
PCT Pub. Date: Apr. 6, 2023

(65) Prior Publication Data
US 2024/0143633 A1    May 2, 2024

(30) Foreign Application Priority Data

Sep. 28, 2021 (CN) .......................... 202111142014.3

(51) Int. Cl.
*G06F 7/00* (2006.01)
*G06F 16/31* (2019.01)
*G06N 5/02* (2023.01)

(52) U.S. Cl.
CPC ............. *G06F 16/313* (2019.01); *G06N 5/02* (2013.01)

(58) Field of Classification Search
CPC .. G06F 16/313; G06F 16/254; G06F 16/5846; G06F 16/7844; G06F 16/248;
(Continued)

(56) References Cited

U.S. PATENT DOCUMENTS

2017/0277996 A1* 9/2017 Vogel ...................... G06F 40/30
2021/0202111 A1* 7/2021 Li .......................... G16H 10/60
(Continued)

FOREIGN PATENT DOCUMENTS

| CN | 106599032 | 4/2017 |
| CN | 113312916 | 8/2021 |

(Continued)

*Primary Examiner* — Mohammad A Sana
(74) *Attorney, Agent, or Firm* — Jiwen Chen; Joywin IP Law PLLC

(57) ABSTRACT

The present invention is a generative event extraction method based on ontology guidance, including: (1) constructing an event ontology knowledge base; (2) designing an event trigger word extraction template and an event argument extraction template; mapping an input event text to a first input sequence, and mapping an input event text integrating an event ontology to a second input sequence; (3) designing a class label mapping function that maps multi-word labels to event types and/or role types; (4) extracting the event ontology corresponding to the input event from the event ontology knowledge base, and constructing the first input sequence and the second input sequence according to the event trigger word extraction template and the event argument extraction template; and (5) predicting, by the event extraction model, the event type and the role type according to the class label mapping function and a pro-
(Continued)

cessing mechanism thereof, and outputting an event trigger word span and an event argument span.

10 Claims, 4 Drawing Sheets

(58) Field of Classification Search
CPC .. G06F 16/93; G06F 7/24; G06N 5/02; G06N 3/044; G06N 3/045; G06N 3/08
See application file for complete search history.

(56) References Cited

U.S. PATENT DOCUMENTS

2023/0035121 A1\* 2/2023 Wei .................... G06F 8/427
2024/0143644 A1\* 5/2024 Huang ................. G06F 16/358

FOREIGN PATENT DOCUMENTS

| | | |
|---|---|---|
| CN | 113420552 | 9/2021 |
| WO | WO2020001373 | 1/2020 |

\* cited by examiner

GENERATIVE EVENT EXTRACTION METHOD BASED ON ONTOLOGY GUIDANCE

This is a U.S. national stage application of PCT Application No. PCT/CN2022/120840 under 35 U.S.C. 371, filed Sep. 23, 2022 in Chinese, claiming priority of Chinese Application No. 202111142014.3, filed Sep. 28, 2021, all of which are hereby incorporated by reference.

FIELD OF TECHNOLOGY

The present invention relates to the technical field of information extraction in natural language processing, in particular to a generative event extraction method based on ontology guidance.

BACKGROUND TECHNOLOGY

As a form of information, an event is defined as an objective fact that specific persons and things interact with each other at a specific time and place, generally at a sentence level. In Topic Detection Tracking (TDT), an event is a set of related statements about a topic, which can be formed by classification or clustering.

The event consists of the following elements: a trigger word, an Event Type, an Event Argument, and an Argument Role. The trigger word of the event indicates a core word of occurrence of the event, which is a verb or noun in most cases. The Event Type refers to a type of the event. The Event Argument refers to participants of the event, mainly consisted of entity, value and time, wherein value is a non-physical event participant, such as a job. The Argument Role refers to a role that the Event Argument plays in the event.

Event extraction is to extract events of interest from unstructured information and present them to a user in a structured manner. An event extraction task can be divided into four sub-tasks: trigger word recognition, event type classification, argument recognition and role classification. The trigger word recognition and event type classification can be combined into an event recognition task. Event recognition classification is to judge an event type of each word in a sentence and is a multi-classification task based on words. The argument recognition and role classification can be combined into an argument role classification task. The role classification task is a multi-classification task based on word pairs to judge a role relationship between any pair of trigger word and entity in the sentence.

The purpose of event extraction is to identify an event trigger with parameters in a text, which is usually expressed as a classification or structured prediction problem. For example, a sentence "The divorce settlement called for Giuliani to pay Hanover more than $6.8 million." is entered, the event extraction should extract two events, wherein one is a "Life: Divorce" event type, a trigger word is "divorce" which consists of an event parameter: an argument span is "Giuliani", a role type is "Person". The other one is a "Transaction: Transfer-Money" event type, a trigger word is "pay" which consists of three event parameters: the argument span is "Giuliani" and the role type is "Giver"; the argument span is "$6.8 million" and the role type is "Money"; and the argument span is "Hanover" and the role type is "Recipient". The inclusion of a plurality of events in the sentence brings more challenges to the event extraction. In addition, argument spans overlap in different events. For example, "Giuliani" in the example sentence needs to play different argument roles in two different types of events at the same time.

A traditional method uses sequence annotation to extract the events, but this cannot solve a problem of argument role overlap. In addition, a traditional event extraction model usually has a problem of needing to design a complex model architecture and weak generalization to new event types.

SUMMARY OF THE INVENTION

In view of the above, the object of the present invention is to provide a generative event extraction method based on ontology guidance to achieve efficient extraction of event structured knowledge under full supervision and small sample scenarios.

In order to realize the purpose of the present invention, the present invention provides the following technical solution:

A generative event extraction method based on ontology guidance, comprising the following steps:

step 1: constructing an event ontology knowledge base based on a domain knowledge base and an event annotation framework;

step 2: designing an event trigger word extraction template and an event argument extraction template for the generative event extraction; the event trigger word extraction template maps an input event text to a first input sequence of an event extraction model; and the event argument extraction template maps the input event text integrating an event ontology to a second input sequence of the event extraction model;

step 3: designing a class label mapping function that handles a mapping of multi-word labels to event types and/or role types;

step 4: for the input event text, extracting the event ontology corresponding to the input event from the event ontology knowledge base, and according to the input event text and the event ontology, constructing the first input sequence and the second input sequence according to the event trigger word extraction template and the event argument extraction template; and step 5: inputting the first input sequence and the second input sequence into the event extraction model, and predicting, by the event extraction model, the event type and the role type according to the class label mapping function and a processing mechanism thereof, and outputting an event trigger word span and an event argument span.

Compared with the prior art, the present invention has at least the following beneficial effects:

On the basis of constructing the event ontology knowledge base, the event ontology and additional prompt words are integrated into the input sequence through the designed event trigger word extraction template and event argument extraction template. In this way, the event ontology knowledge is injected into the event extraction model and the correlation between event trigger words and event arguments is implicitly modeled. Then, the prompt words of integrated event ontology are used to guide the generation of event sequence text, which improves the performance under full supervision and small samples, improves the convergence speed of the event extraction model, improves the extraction speed and accuracy of multi-event extraction and overlapping event arguments, and has certain industrial practical value.

BRIEF DESCRIPTION OF THE DRAWINGS

In order to illustrate the embodiments of the present invention or the technical solutions in the prior art more clearly, the following briefly introduces the accompanying drawings used in the description of the embodiments or the prior art. Obviously, the drawings in the following description are only some embodiments of the present invention. For those of ordinary skill in the art, other drawings can also be obtained from these drawings without creative efforts.

DETAILED DESCRIPTION OF THE EMBODIMENTS

In order to make the purpose, technical solution and advantages of the present invention more clearly understood, the present invention is further explained in detail in the following combined with accompany drawings and embodiments. It should be understood that specific implementations described herein are intended only to explain the present invention and do not limit the protection scope of the present invention.

In order to solve the problem of argument role overlap in existing event extraction methods, as well as the problem of slow and inaccurate event extraction caused by a complex model architecture design and weak generalization of new event types, the present invention provides a generative event extraction method based on ontology guidance, which reorganizes structured event information into text information as supervision. An end-to-end language generation model is used to guide generation of a sequence text containing the event information. In order to integrate external event knowledge, an event ontology knowledge base is constructed for each sub-event type through an external knowledge base, and a relationship between events is established through a propagation algorithm, the event ontology knowledge base is serialized and integrated with a prompt template, the event ontology knowledge is injected into a model, and correlation between event trigger words and event arguments is implicitly modeled. On this basis, event extraction is regarded as a new framework of natural language generation, and a fine-tuning method based on prompt words reduces a gap between a pre-trained model and a fine-tuning task, and improves transfer and adaptation efficiency of knowledge in the pre-trained model to a downstream task.

Figure 1:
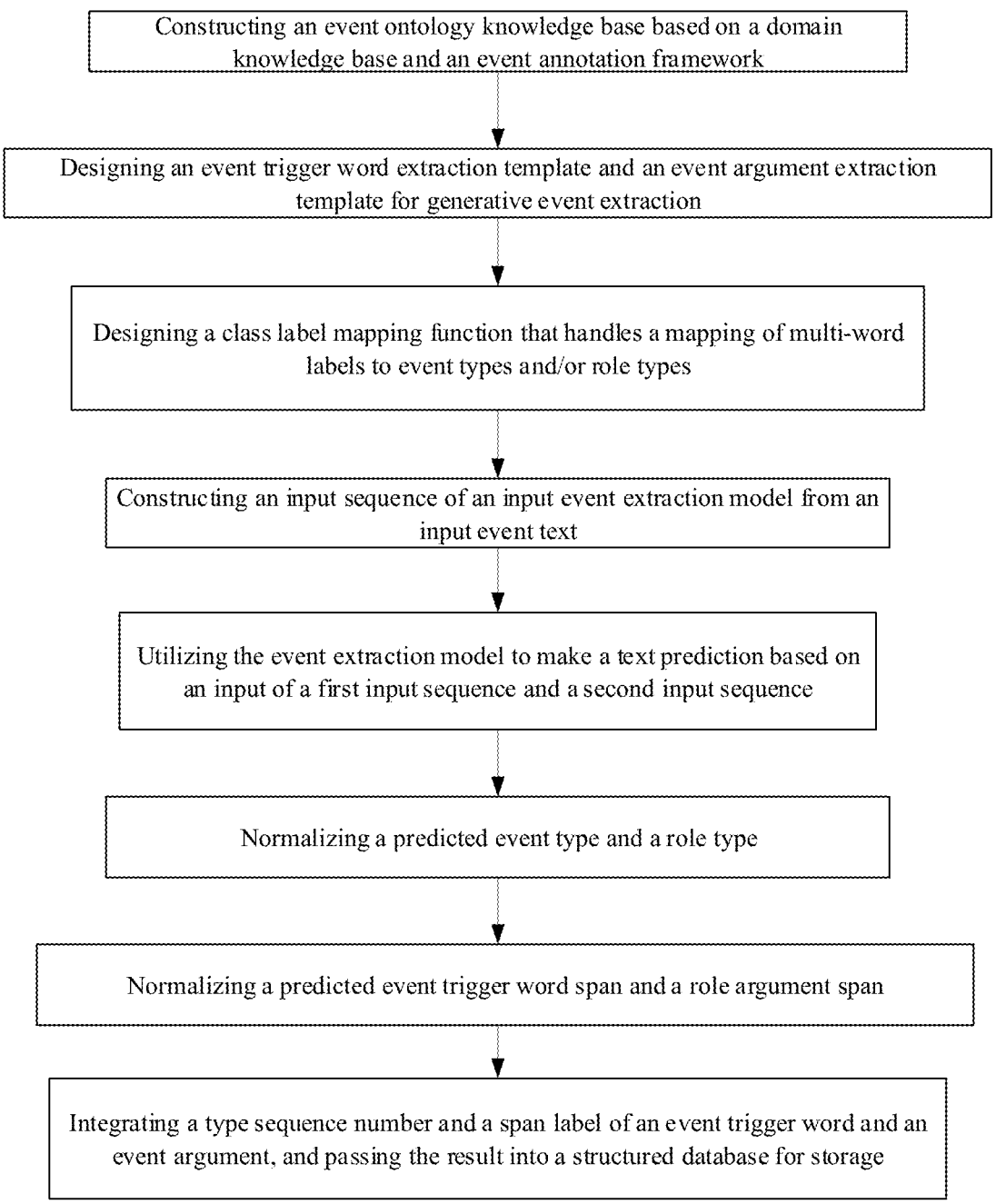
FIG. 1 is a flow chart of a generative event extraction method based on ontology guidance provided by an embodiment.
Figure 2:
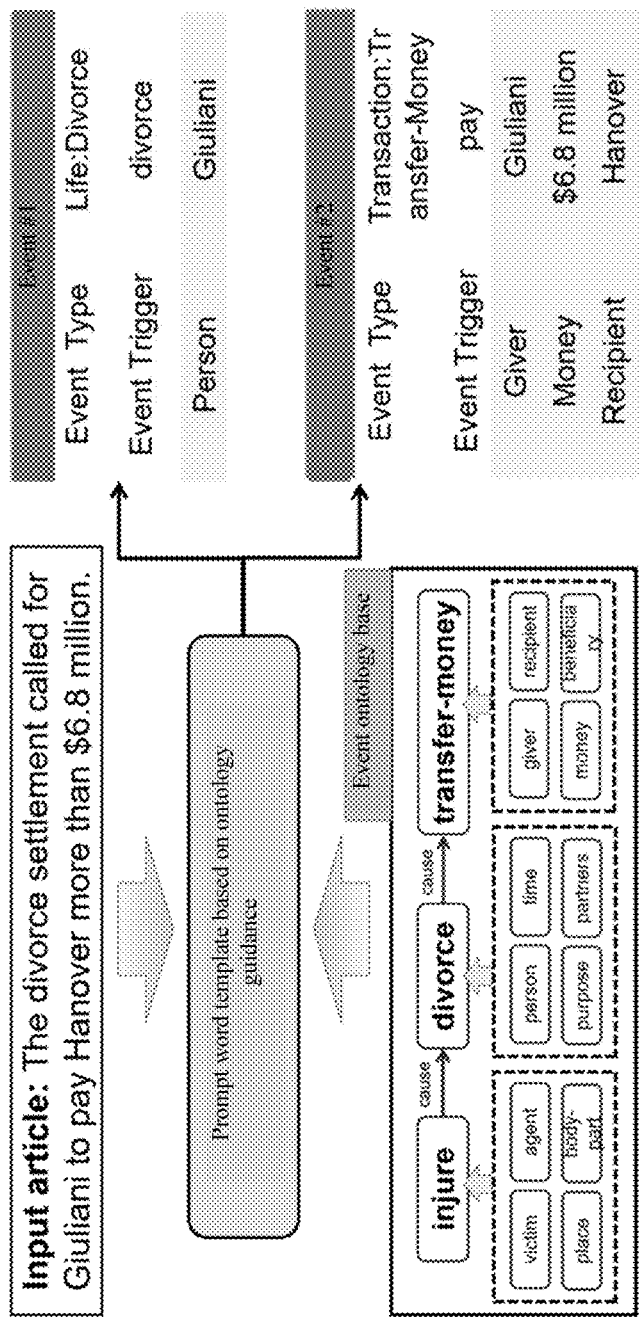
FIG. 2 is an overall framework diagram of a generative event extraction method based on ontology guidance provided by an embodiment.

FIG. 1 is a flow chart of a generative event extraction method based on ontology guidance provided by an embodiment, and FIG. 2 is an overall framework of a generative event extraction method based on ontology guidance provided by an embodiment. As shown in FIG. 1 and FIG. 2, the generative event extraction method provided by the embodiment comprises the following steps:

Step 1: constructing an event ontology knowledge base based on a domain knowledge base and an event annotation framework.

In the embodiment, the process of constructing the event ontology knowledge base is as follows:
step 1.1: taking an automatic content extraction predefined event framework as a target event ontology, wherein automatic content extraction corpus is various types of data consisted of entities, relations and event annotations released by a linguistic data consortium, and the automatic content extraction corpus provides a detailed framework for the annotations of event information;
step 1.2: extracting an event framework related to the target event ontology in FrameNet as an expanded event ontology, wherein the FrameNet takes frame semantics as a theoretical basis, so that the meaning of most words can be best understood through a semantic framework (description of events, relations or entities and their participants), and we use the semantic framework related to the event ontology to expand a source for constructing the event ontology; and
step 1.3: integrating the target event ontology and the expanded event ontology, and carrying out de-duplication and manual inspection, so as to obtain the event ontology knowledge base.

Taking an automatic content extraction 2005 event extraction data set as an example, in this example, 33 core event ontologies and 1161 non-core event ontologies are constructed by using the step 1 of the method, and 28 relation ontologies between events are established by an event-event propagation algorithm.

Taking divorce events as an example to show the framework of event extraction. The ontology knowledge base of an event data set has constructed core event ontologies such as "injure", "divorce" and "transfer-money" for the divorce events. Each event ontology has its own non-core event ontologies. For example, the core event ontology of "divorce" is associated with other non-core event ontologies such as "person", "time", "purpose" and "partners". In addition, there is also a relation between events. For example, the core event ontology of "injure" points to the core event ontology of "divorce" through the relation of "cause" to illustrate that the injury event is the cause of the divorce event.

Step 2: designing an event trigger word extraction template and an event argument extraction template for the generative event extraction.

In the embodiment, the designed extraction template is an input sequence for mapping an input text integrating the event ontology to a standard pre-trained event extraction model, that is, a prompt template that the event ontology and the input event text need to jointly generate event extraction. Due to different tasks of trigger word extraction and event argument extraction, different prompt templates are designed for this purpose.

In the embodiment, the designed event trigger word extraction template can map the input event text to a first input sequence of the event extraction model. A specifically designed event trigger word extraction template is as follows:

[first marker]<Pseudo template> <Input event text> [second marker] The event trigger word is [MASK], a trigger word token is, the corresponding English word is [CLS]<pseudo template> <input sentence> [sos] The trigger word is [MASK], trigger token is;

The pseudo template takes unused dummy tags embedded in pre-trained words, such as [unused1] [unused2], . . . , [unused9]. To simplify, the <pseudo template> is represented by s1 and the <input sentence> is represented by s2.

In the embodiment, the designed event argument extraction template maps the input event text integrating the event ontology to a second input sequence of the event extraction model. The designed event argument extraction template is as follows:

[first marker]<event ontology> <Input event text> [second marker] argument type is [MASK], the argument token is, the corresponding English word is [CLS]<Event ontology> <input sentence> [SOS] The argument type is [MASK], argument token is, wherein, the event ontology is filled with the event ontologies mentioned in the event ontology knowledge base. For simplicity, <Event ontology> is represented by s1 and <input sentence> is represented by s2.

Step 3: designing a class label mapping function that handles a mapping of multi-word labels to event types and/or role types.

In some cases, the multi-word label forms the event type or the role type. In order to achieve accurate prediction of the event types and the role types, this embodiment designs a class label mapping function to handle the mapping of the multi-word tags to the event types and/or the role types.

In the embodiment, the designed class label mapping function is as follows:

$$Y(r_i)=[w_1, w_2, \ldots, w_n]$$

in the event type prediction, $Y(r_i)$ represents the mapping function between an i-th event type and the multi-word label, and $Y(r_i)$ represents a word embedding vector of an n-th word label of the event type; and in the role type prediction, $Y(r_i)$ represents the mapping function between an i-th role type and the multi-word label, and $w_n$ represents a word embedding vector of an n-th word label of the role type.

Based on the above class label mapping function, the event types or the role types can be predicted.

Step 4: constructing an input sequence of an input event extraction model from the input event text.

In the embodiment, the input event text is pre-processed firstly, which specifically comprises: deleting invalid characters in a html format, such as <div>, <style>, and deleting words that do not appear in a predefined vocabulary list. Then, the event ontology corresponding to the input event is extracted from the event ontology knowledge base by rule matching. Next, according to the input event text and the event ontology, the first input sequence and the second input sequence are constructed according to the event trigger word extraction template and the event argument extraction template.

Step 5: utilizing the event extraction model to make a text prediction based on the input of the first input sequence and the second input sequence.

In the embodiment, the first input sequence and the second input sequence are input into the event extraction model, and the event extraction model predicts the event type and the role type according to the class label mapping function and its own processing mechanism, and outputs an event trigger word span and an event argument span. In the embodiment, the event extraction model adopts a codec Transformer framework.

when making prediction of the event types and/or the role types using the event extraction model, the following formula is used to obtain prediction probabilities of the event types and/or the role types:

$$p(r_i) = \frac{\sum_{w \in r_i} \exp(w \cdot h_{[MASK]})}{\sum_{w' \in R} \exp(w' \cdot h_{[MASK]})}$$

wherein $p(r_i)$ represents a prediction probability of an ri event type or a role label $p(r_i)$, $h_{[MASK]}$ represents an output vector corresponding to the event extraction model at [MASK], w represents a word embedding vector of a word label of a target event type/role type, w' represents a word embedding vector of word labels of all event types/role types, and R represents a set of all event types/role labels;

when the event extraction model is used to predict the event trigger word span and/or the event argument span, predictions of the event trigger word span and/or the event argument span are modeled as a sequence generation task. For an event text set S, the input event text is A and an associated event ontology is O, a conditional distribution $p(H|A,O;\theta_E,\theta_G)$ of integrated event ontology is learned by training $Z=E_s(A,O)$ and $H=G_s(Z)$, wherein Z is a potential source domain representation obtained by learning in an encoder E, H represents a potential source domain representation obtained by learning in a decoder G, H and $\theta_G$, represent model parameter sets of the encoder and decoder in the source domain, $p(H|A,O;\theta_{E_s},\theta_{G_s})$ represents an overall probability of an output sequence H generated by the given input event text A and the associated event ontology O, wherein $$p(H \mid A, O; \theta_{E_s}, \theta_{G_s}) = \prod_{t=1}^{L} p(h_t \mid \{h_1, \ldots, h_{t-1}\}; \theta_{E_s}, \theta_{G_s}).$$

In the embodiment, the first input sequence and the second input sequence constructed based on the event trigger word extraction template and the event argument extraction template are used to fine-tune parameters of the event extraction model, and the fine-tuned event extraction model is used to perform a prediction task. During the training, a loss function used is as follows:

$$L_{span}(\theta_{E_s}, \theta_{G_s}) = E_{(a,h) \sim s}[-\log p(H|A,O;\theta_{E_s},\theta_{G_s})]$$

Figure 3:
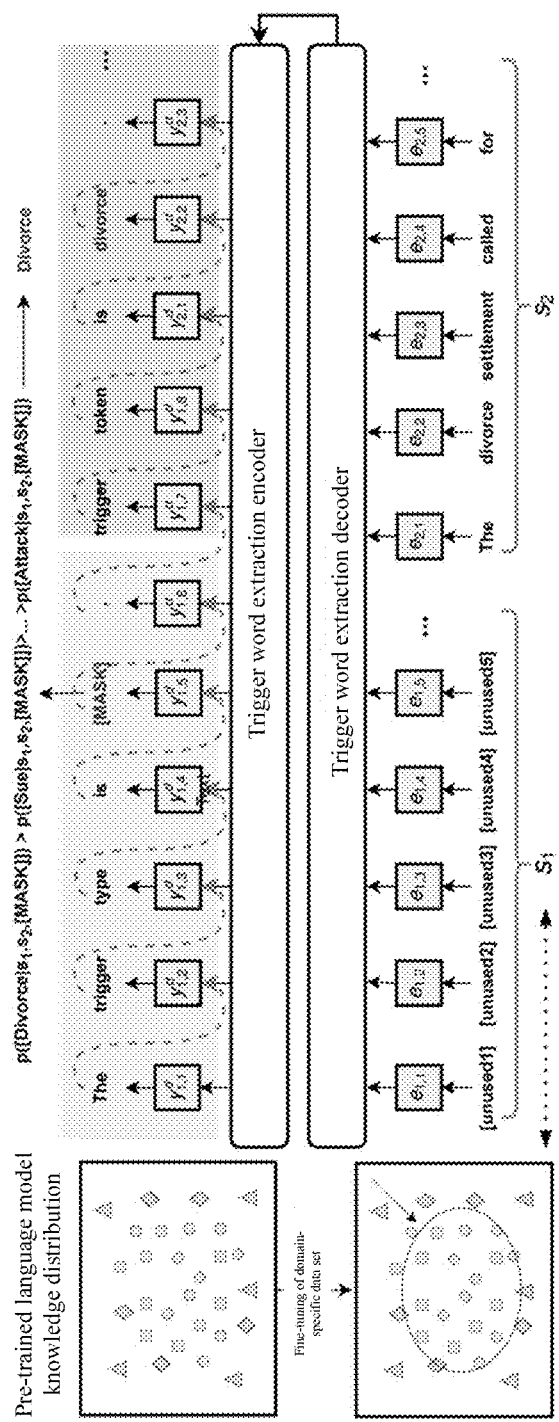
FIG. 3 is a model structure diagram of event trigger word extraction and event type classification provided by an embodiment.

The extraction template for the event trigger word extraction is input into a standard pre-trained codec Transformer framework in a form of text sequence to predict the event type and event trigger word span. Taking a model structure diagram of the event trigger word extraction and event type classification shown in FIG. 3 as an example, an input sequence of model encoder is "[unused1] [unused2] . . . [unused9] The divorce settlement called for Giuliani to pay Hanover more than $6.8 million.", an output supervision sequence of the model decoder is "The trigger type is [MASK], trigger token is".

The event trigger word type predicts a probability output of each event type at the "[MASK]" position, and the role types are arranged in a reverse order according to probability values:

$$p(\text{Divorce}|s_1,s_2,[MASK]) > p(\text{Sue}|s_1,s_2, [MASK]) > \ldots > p(\text{Attack}|s_1,s_2,[MASK])$$

According to the probability values of the event types, the event type is determined as "Life: Divorce" event type, and the event trigger word span is naturally generated by the model as "divorce".

A final output sequence text is "The trigger type is Life: Divorce, trigger token is divorce.".

Figure 4:
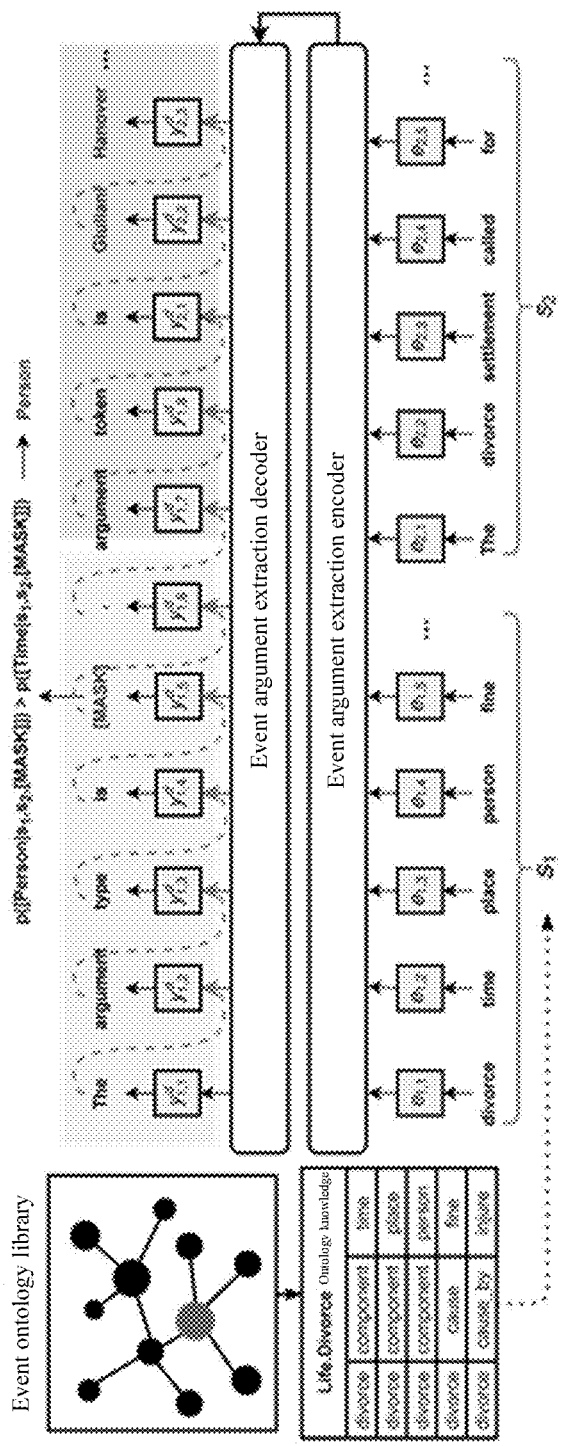
FIG. 4 is a model structure diagram of event argument extraction and event role classification provided by an embodiment.

The extraction template for the event argument extraction is input into the standard pre-trained codec Transformer framework in a form of text sequence to predict the event argument role type and event argument span. Taking a model structure diagram of the event argument extraction and event role classification shown in FIG. 4 as an example, an input sequence of model encoder is "divorce time place person fine partners injure victim agent place bodypart transfer money giver recipient money beneficiary. The divorce settlement called for Giuliani to pay Hanover more than $6.8 million." and an output supervision sequence of the model decoder is "The argument type is [MASK], argument token is".

The role type of the event argument predicts the probability output of each role type at the "[MASK]" position, and the role types are arranged in the reverse order according to the probability values:

$$p(\text{Person}|s_1, s_2, [\text{MASK}]) > p(\text{Time}|s_1, s_2, [\text{MASK}])$$

According to the probability values of the role types, the role type is determined as "Person", and a corresponding event argument span is naturally generated by the model as "Giuliani Hanover".

The final output sequence text is "The argument type is Person, argument token is Giuliani Hanover.".

Step 6: normalizing the predicted event type and role type.

In the embodiment, after filtering out types below a probability threshold, the event type is mapped to an event type serial number, and the role type is mapped to a role type serial number.

Step 7: normalizing the predicted event trigger word span and role argument span.

In the embodiment, after spans below the probability threshold is filtered, the event trigger word span is mapped to an event trigger word span label, and the event argument span is mapped to an event argument span label.

step 8: integrating a type sequence number and a span label of the event trigger word and the event argument, and passing the result into a structured database for storage.

For example, two events are extracted in the embodiment, one of which is "Life: Divorce" event type, a type serial number is 14, the event trigger word is "divorce", a span label is (2, 3) and consists of an event parameter: the argument span is "Giuliani", the span label is (6, 7), the role type serial number is "Person", the role label is 35. The other one is a "Transaction: Transfer-Money" event type, the type serial number is 20, the trigger word is "pay", a span label is (8, 9) and consists of three event parameters: the argument span is "Giuliani", the span label is (6, 7), the role type is "Giver", and the role type serial number is 45; the argument span is "$6.8 million" and the span label is (12, 14), the role type is "Money", and the role type serial number is 46; the argument span is "Hanover", the span label is (9, 10), the role type is "Recipient", and the role type serial number is 47; and finally, the extraction result of structural event is passed into the structured database for storage.

The generative event extraction method based on ontology guidance provided by the above embodiment can be used for structured sorting of Internet news information, automatically extracting news event names and their associated news event arguments, and can be used in downstream scenarios such as news directed recommendation, associated document sorting, hot-spot based search query to improve the speed and accuracy of news event extraction.

In the generative event extraction method based on ontology guidance provided by the above embodiment, structured knowledge extraction is performed for complex input event text; with a natural language processing related technology, an end-to-end language generation model is used as the event extraction model, and the event ontology knowledge is combined to guide the event extraction, and model performance under fully supervision and small sample scenarios is improved. It provides a better solution for extracting public corpus information efficiently.

In the generative event extraction method based on ontology guidance provided by the above embodiment, in view of the complex model architecture of the new event type and the generalization ability of the new event type, the present invention introduces an event ontology library, which can achieve a faster model convergence speed and significantly improve the performance under a condition of few samples by constructing and injecting event knowledge in time. By constructing the appropriate template for event ontology knowledge and efficiently integrating the event ontology knowledge, the present invention can efficiently extract the event structured knowledge under full supervision and few samples, and has certain industrial practical value. The method does not require any additional parameter in addition to the existing parameters in the pre-trained language model, so the implementation is simple and flexible.

The above implementations describe in detail the technical solution and beneficial effects of the present invention. It should be understood that the above embodiments are only the most preferred embodiments of the present invention and are not used to limit the present invention. Any modification, supplement and equivalent replacement made within the scope of the principle of the present invention shall be included within the protection scope of the present invention.

The invention claimed is:

1. A generative event extraction method based on ontology guidance, comprising the following steps:
   step 1: constructing an event ontology knowledge base based on a domain knowledge base and an event annotation framework;
   step 2: designing an event trigger word extraction template and an event argument extraction template for the generative event extraction; the event trigger word extraction template maps an input event text to a first input sequence of an event extraction model; and the event argument extraction template maps the input event text integrating an event ontology to a second input sequence of the event extraction model;
   step 3: designing a class label mapping function that handles a mapping of multi-word labels to event type or role type;
   step 4: for the input event text, extracting the event ontology corresponding to the input event from the event ontology knowledge base, and according to the input event text and the event ontology, constructing the first input sequence and the second input sequence according to the event trigger word extraction template and the event argument extraction template; and
   step 5: inputting the first input sequence and the second input sequence into the event extraction model, and predicting, by the event extraction model, the event type and the role type according to the class label mapping function and a processing mechanism thereof, and outputting an event trigger word span and an event argument span.

2. The generative event extraction method based on ontology guidance according to claim 1, wherein in step 1, a process of constructing an event ontology knowledge base is as follows:
   step 1.1: taking an automatic content extraction predefined event framework as a target event ontology;
   step 1.2: extracting an event framework related to the target event ontology in FrameNet as an expanded event ontology; and
   step 1.3: integrating the target event ontology and the expanded event ontology, and carrying out de-duplication and manual inspection, so as to obtain the event ontology knowledge base.

3. The generative event extraction method based on ontology guidance according to claim 1, wherein in step 2, the designed event trigger word extraction template is as follows:
   [first marker]<Pseudo template > <Input event text> [second marker] The event trigger word is [MASK], a trigger word token is, the corresponding English word is [CLS]<pseudo template><input sentence> [SOS] The trigger word is [MASK], trigger token is;
   wherein the pseudo template takes unused dummy tags embedded in pre-trained words.

4. The generative event extraction method based on ontology guidance according to claim 1, wherein in step 2, the designed event argument extraction template is as follows:
   [first marker]<event ontology> <Input event text> [second marker] argument type is [MASK], the argument token is, the corresponding English word is [CLS] <Event ontology> <input sentence> [SOS] The argument type is [MASK], argument token is.

5. The generative event extraction method based on ontology guidance according to claim 1, wherein in step 3, the designed class label mapping function is as follows:

$$Y(r_i) = \{w_1, w_2, \ldots, w_n\}$$

in the event type prediction, $Y(r_i)$ represents the mapping function between an i-th event type and the multi-word label, and $Y(r_i)$ represents a word embedding vector of an n-th word label of the event type; and
   in the role type prediction, $Y(r_i)$ represents the mapping function between an i-th role type and the multi-word label, and $w_n$ represents a word embedding vector of an n-th word label of the role type.

6. The generative event extraction method based on ontology guidance according to claim 1, wherein in step 5, the event extraction model adopts a codec Transformer framework;
   when making prediction of the event type or role type using the event extraction model, the following formula is used to obtain prediction probabilities of the event type or role type:

$$p(r_i) = \frac{\sum_{w \in r_i} \exp(w \cdot h_{[MASK]})}{\sum_{w' \in R} \exp(w' \cdot h_{[MASK]})}$$

wherein $p(r_i)$ represents a prediction probability of an ri event type or a role label $p(r_i)$, $h_{[MASK]}$ represents an output vector corresponding to the event extraction model at [MASK], w represents a word embedding vector of a word label of a target event type/role type, w' represents a word embedding vector of word labels of all event types/role types, and R represents a set of all event types/role labels;
   when the event extraction model is used to predict the event trigger word span and/or the event argument span, predictions of the event trigger word span and/or the event argument span are modeled as a sequence generation task. For an event text set S, the input event text is A and an associated event ontology is O, a conditional distribution $p(H|A,O;\theta_{E_s},\theta_{G_s})$ of integrated event ontology is learned by training $Z=E_s(A,O)$ and $H=G_s(z)$, wherein Z is a potential source domain representation obtained by learning in an encoder E, H represents a potential source domain representation obtained by learning in a decoder G, H and $\theta_{G_s}$ represent model parameter sets of the encoder and decoder in the source domain, $p(H|A, O;\theta_{E_s},\theta_{G_s})$ represents an overall probability of an output sequence H generated by the given input event text A and the associated event ontology O, wherein $$p(H \mid A, O; \theta_{E_s}, \theta_{G_s}) = \prod_{t=1}^{L} p(h_t \mid \{h_1, \ldots, h_{t-1}\}; \theta_{E_s}, \theta_{G_s}).$$

7. The generative event extraction method based on ontology guidance according to claim 1, wherein the first input sequence and the second input sequence constructed based on the event trigger word extraction template and the event argument extraction template are used to fine-tune parameters of the event extraction model, and the fine-tuned event extraction model is used to perform a prediction task.

8. The generative event extraction method based on ontology guidance according to claim 1, wherein the generative event extraction method further comprises:
   step 6: normalizing the predicted event type and role type in step 5; after filtering out types below a probability threshold, mapping the event type to an event type serial number, and mapping the role type to a role type serial number.

9. The generative event extraction method based on ontology guidance according to claim 8, wherein the generative event extraction method further comprises:
   step 7: normalizing the predicted event trigger word span and event argument span which are predicted in step 5; after filtering out spans below the probability threshold, mapping the event trigger word span to an event trigger word span label, and mapping the event argument span to an event argument span label;
   step 8: integrating a type sequence number and a span label of the event trigger word and the event argument, and passing the result into a structured database for storage.

10. The generative event extraction method based on ontology guidance according to claim 1, wherein the generative event extraction method further comprises:
   step 7: normalizing the predicted event trigger word span and event argument span which are predicted in step 5; after filtering out spans below the probability threshold, mapping the event trigger word span to an event trigger word span label, and mapping the event argument span to an event argument span label;
   step 8: integrating a type sequence number and a span label of the event trigger word and the event argument, and passing the result into a structured database for storage.

\* \* \* \* \*